Patented Feb. 2, 1943

2,310,077

UNITED STATES PATENT OFFICE 2,310,077

INSULATING PART OF STORAGE BATTERIES

Mortimer T. Harvey, East Orange, N. J., assignor to The Harvel Corporation, a corporation of New Jersey No Drawing. Application October 9, 1939, Serial No. 298,705

7 Claims. (Cl. 136—146)

The present invention relates to electrical insulating and mechanically spacing or supporting elements made from cashew nut shell liquid for use in storage batteries in positions and for purposes in which they are subject to contact with the electrolyte of the storage battery.

An object of the present invention is to provide storage battery elements which are subject to contact with the electrolyte of the battery and which are inert to or will resist the chemical action of the electrolyte.

According to the present invention, insulating or mechanically spacing or supporting parts subject to contact with the electrolyte of a storage battery are made of cashew nut shell liquid which has been modified to a state in which it is resistant to the action of the electrolyte and has mechanical and electrical characteristics to suit the purpose of its use.

The storage battery parts of the present invention, made of modified cashew nut shell liquid, are resistant both to acid solutions such as sulphuric acid and to solutions of alkaline materials such as potassium hydroxide and sodium hydroxide.

Examples of parts of a storage battery made according to the present invention are the box or casing for holding the electrolyte which can be required to support the elements of the electrodes of the cells of the battery, perforate holders of tubular and other shapes for supporting lead peroxide paste of the negative electrodes of lead-lead peroxide-sulphuric acid type of battery, and spacing sheets interposed between the negative and positive plates of storage batteries of various types. The storage battery box can be made entirely of modified cashew nut shell liquid or the lining thereof can be made of modified cashew nut shell liquid. When the entire box is made of this material it can be of mechanical strength required of it as a container and when the box is lined of this material variations can be made to suit expansion and contraction of the material of the box itself. When electrode separators are made of this material it can be of modifications to suit requirements of flexibility and of suitability for manufacturing operations such as the punching of perforations therein when required. In other cases perforate separators can be made by incorporating a removable material with the modified cashew nut shell liquid in the preparation of the separator, said removable material being removed by water solution or chemical action of sulphuric acid or caustic solution or in some other way after the modified cashew nut shell liquid has been brought to a definite state or form. The materials of the present invention are suitable also for use in the grid separators and side insulators and other parts of storage batteries of the nickel hydroxide type in which an alkaline solution is used as the electrolyte.

The products of the present invention can be made either with or without the incorporation of plastic rubber as shown by following examples. One of the advantages of the present invention is that the use of the modified cashew nut shell liquid decreases the amount of sulphur used in vulcanizing the rubber or makes it possible to entirely eliminate the sulphur and thereby reduces or eliminates the action of the electrolyte on the sulphur.

Illustrative examples of embodiments of the present invention are as follows:

*Example 1*

Cashew nut shell liquid was distilled with steam at about 250° C. to about 300° F. until about one half of the original weight remained as a heavy-viscous residue. About one hundred parts by weight of this residue, one part of diethyl sulphate and twenty parts of furfuraldehyde were mixed together at about 200° F. and poured while hot into a rectangular mold, after which the mold was loosely covered and the whole heated in an oven at about 220° F. for about sixteen hours. At the end of this period the material had solidified, both by polymerization and by condensation with the furfuraldehyde, to a rubber-like block. This block was removed from the mold and then sliced with a band saw and the slices heated further at about 220° F. for sixteen hours. The surfaces of these slices were then smoothed off and a multiplicity of fine openings punched in the slices to form grid-like structures which were suitable for use as separators in storage batteries of the sulphuric acid electrolyte and potassium hydroxide types.

*Example 2*

About seventy-five parts by weight of crepe rubber, one hundred and fifty parts of cashew nut shell liquid which has been modified to a resilient rubber-like state by polymerization, sixty parts of sulphur and nine parts of hexamethylene tetramine were thoroughly mixed together and sheeted on a rubber mill and then cured for one hour at about 300° F. This gave an excellent stock for punching out battery separator plates.

*Example 3*

About one hundred parts by weight of rubber, nine parts of zinc oxide, one hundred parts of the cashed nut shell liquid polymer described in Example 2, fifty parts of sulphur and two parts of diphenyl guanidine were mixed and sheeted out on a rubber mixing roll and cured for one hour at about 300° F.

Example 4

About one hundred parts by weight of crepe rubber, fifty parts of sulphur, nine parts of zinc oxide, two parts of diphenyl guanidine and fifty parts of a heat reactive resin made by heating together one hundred parts each of cardanol and cashew nut shell liquid, fifteen parts of hexamethylene tetramine and four parts of copper oleate at about 250° F. to obtain a solid button of heat reactive resin on cooling. Cardanol is a phenol and is the distillate obtained on the steam distillation of cashew nut shell liquid at about 250° F. to about 300° F. until about half of the cashew nut shell liquid was left as a residue, described in Example 1 above. A mixture of the heat reactive resin and the other ingredients above set forth in this example were milled together and sheeted out on a rubber mill with a hot roll and then cured for one-half hour at about 155° F.

Example 5

Another example was made up and cured in the same manner and with the same ingredients, in the same proportions, as in Example 4 except that for the heat reactive resin described therein there was substituted the same quantity of a heat reactive resin made by heating together under a reflux condenser about one hundred parts by weight of cardanol, thirty five parts of a commercial water-formaldehyde solution of about 37% strength and about one hundred parts of a technical grade of ammonia at about 200° F. for about one hour and then dehydated and then bodies at about 250° F.

Example 6

About one hundred parts by weight of a rubber-like polymer of cashew nut shell liquid and four parts of hexamethylene tetramine were milled together on a rubber mill for about thirty minutes and then sheeted, and the sheeted stock cured in a press for about thirty minuted at about 310° F. and then for one hour at 250° F. in an oven.

Example 7

In another example there was added to the ingredients of Example 6 ten parts of a rubber-like resin made by polymerizing one cardanol with sulphuric acid or other polymerizing agent to a thick liquid and then adding to one hundred parts by weight of this thick liquid polymer, four parts of hexamethylene tetramine and heating at about 250° F. until a heavy rubber-like reaction product is obtained. The mixture of rubber-like resin, rubber-like polymer of cashew nut shell liquid and hexamethylene tetramine were milled, sheeted and cured in the same manner as in Example 6.

Example 8

In a further example the ingredients were the same as in Example 7 except that twenty parts of the rubber-like resin were added to the ingredients of Example 6. The treatment of the ingredients of Example 8 were the same as in Examples 6 and 7.

General example

In each of the above examples there can be added a dust of modified cashew nut shell liquid examples of which are described below in Examples 9 and 10 in various amounts, for example up to twice the weight of the total of the ingredients given under each of the above examples. This dust can be added to the other ingredients of Example 1 by mixing at any time before the mixture is poured, and can be added to the other ingredients of Examples 2 to 8 on the rubber mill.

Example 9

To about one hundred parts by weight of the cashew nut shell liquid residue described in Example 1 are added five parts of diethyl sulphate and twenty parts of furfuraldehyde, the whole being thoroughly mixed together at about 180° F. and cured over night at about 250° F. and then ground to a predetermined fineness.

Example 10

Two hundred parts by weight of the residue described in Example 1, one hundred parts of cashew nut shell liquid, twenty parts of paraformaldehyde and three parts of diethyl sulphate are mixed together at about 180° F. and then cured over night at about 250° F. and then ground to a dust.

Specific examples of mixtures of cashew nut shell liquid dust material in cashew nut shell liquid modified cashew nut shell liquid for the purposes of the present invention are as follows:

Example 11

About fifty parts by weight of the dust of Example 9, five parts of hexamethylene tetramine and one hundred parts of a viscous, rubber-like material made by heating together about one hundred parts of a liquid polymer of cashew nut shell liquid and about seven parts of hexamethylene tetramine are mixed together and sheeted on the rubber mill.

Example 12

In another example the formula of Example 11 is used but the amount of the dust of Example 9 is increased from fifty parts to one hundred parts.

The sheeted products of Examples 11 and 12 can be handled as in the other examples for making separators. And as in the general example the dust of Example 10 can be used in place of all or part of the dust of Example 9 in Examples 11 and 12.

The fineness of the dust of Examples 9 and 10 when used as described in the general example can be from about 70 to 100 mesh, but coarser or finer dusts can be used.

One advantage of the use of the dust is that it is an aid in obtaining a good sheeted stock which can be punched or stamped to form perforated separators.

The temperatures and length of time of curing the various stocks of the above examples can be varied to obtain various degrees of flexibility or stiffness or of hardness or of toughness or britleness to suit various conditions or purposes.

The material of Example 1 and the variations thereof given in Examples 9 and 10 can be cast in molds to form battery boxes or tubular lead peroxide holders which can be slitted with saws to form perforations therethrough and to make other shapes and forms.

Having thus described my invention, what I claim and desire to protect by Letters Patent is:

1. A storage battery separator comprising a flat perforated non-conducting sheet made of polymerized cashew nut shell liquid.

2. A non-conducting separator for storage battery plates comprising polymerized cashew nut shell liquid.

3. In a storage battery of the lead-lead peroxide-sulphuric acid electrolyte type, a part for retaining active material of said battery in desired position, said part being made of an aldehyde-cashew nut shell liquid resin.

4. In a storage battery of the lead-lead peroxide-sulphuric acid electrolyte type, a part for retaining active material of said battery in desired position, said part being made of an aldehyde-polymerized cashew nut shell liquid resin.

5. In a storage battery of the lead-lead peroxide-sulphuric acid electrolyte type, a part for retaining active material of said battery in desired position, said part being made of an aldehyde-cashew nut shell liquid distillation residue resin.

6. In a storage battery of the lead-lead peroxide-sulphuric acid electrolyte type, a part for retaining active material of said battery in desired position, said part being made of an aldehyde-polymerized cashew nut shell liquid distillation residue resin.

7. A non-conducting separator for storage battery electrodes comprising a composition of vulcanized rubber and polymerized cashew nut shell liquid.

MORTIMER T. HARVEY.